United States Patent [19]

Kondo et al.

[11] 4,156,709

[45] May 29, 1979

[54] PROCESS FOR PREPARING A POLYPROPYLENE FILM FOR SHRINK PACKAGING

[75] Inventors: Kazuo Kondo, Marugame; Toyoki Wano, Zentsuji, both of Japan

[73] Assignee: Okura Kogyo Kabushiki Kaisha, Marugame, Japan

[21] Appl. No.: 853,480

[22] Filed: Nov. 21, 1977

[30] Foreign Application Priority Data

Apr. 4, 1975 [JP] Japan .................. 50-43025

Related U.S. Application Data

[63] Continuation of Ser. No. 672,473, Mar. 31, 1976, abandoned.

[51] Int. Cl.² ................................ B29D 7/24
[52] U.S. Cl. .................... 264/171; 264/209; 264/210 R; 264/230; 264/342 R
[58] Field of Search .............. 264/210 R, 230, 95, 264/342 R, 342 RE, 209, 171

[56] References Cited

U.S. PATENT DOCUMENTS

| | | | |
|---|---|---|---|
| 3,234,313 | 2/1966 | Miller et al. | 264/230 |
| 3,271,495 | 9/1966 | Gronholz et al. | 264/289 |
| 3,308,215 | 3/1967 | Last | 264/230 |
| 3,433,573 | 3/1969 | Holladay et al. | 264/95 |
| 3,510,549 | 5/1970 | Tsuboshima et al. | 264/95 |
| 3,634,552 | 1/1972 | Foglia et al. | 264/290 R |
| 3,849,520 | 11/1974 | Bullard et al. | 264/290 R |
| 3,891,737 | 6/1975 | Marsh et al. | 264/230 |
| 3,962,388 | 6/1976 | Driscoll | 264/210 R |

FOREIGN PATENT DOCUMENTS

43-26114  1969  Japan.
43-26115  1969  Japan.

Primary Examiner—Jeffery R. Thurlow
Attorney, Agent, or Firm—Blanchard, Flynn, Thiel, Boutell & Tanis

[57] ABSTRACT

A film for shrink packaging is prepared by extruding a tubular film made of crystalline polypropylene or crystalline ethylene-propylene copolymer containing up to 10% of ethylene monomer units, and from one to 10% of ethylene-vinylacetate copolymer containing 10 to 50% of vinyl acetate monomer units, and then biaxially stretching the tubular film.

3 Claims, 1 Drawing Figure

• STRETCHED FILM OF EXAMPLE

○ CONVENTIONAL STRETCHED FILM OF EXPERIMENT NO. 1

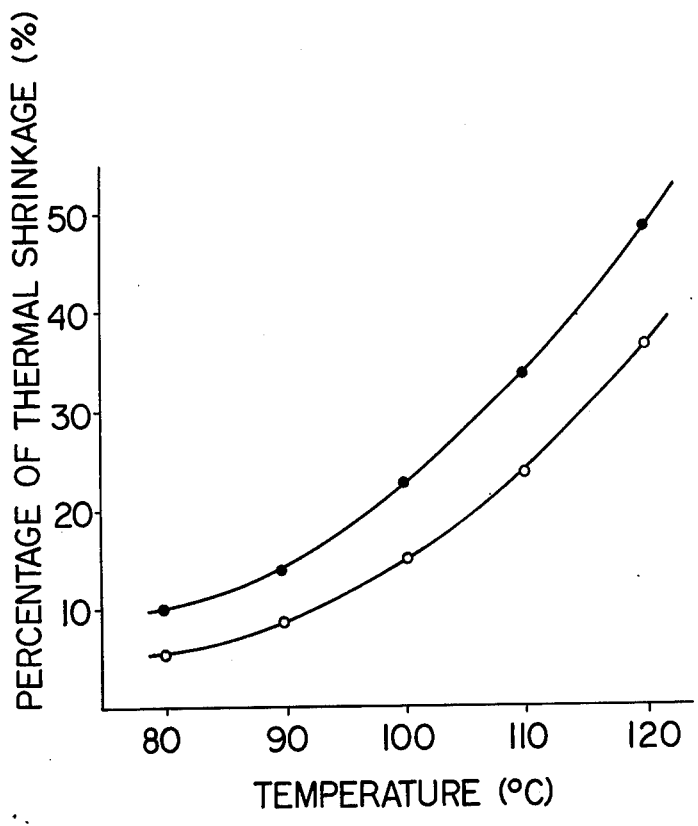
- STRETCHED FILM OF EXAMPLE
- CONVENTIONAL STRETCHED FILM OF EXPERIMENT NO.1

PROCESS FOR PREPARING A POLYPROPYLENE FILM FOR SHRINK PACKAGING

BACKGROUND OF THE INVENTION

1. Field of the Invention

This invention relates to a process for preparing polypropylene-based film for shrink packaging which possesses excellent heat shrinkability including shrinkability at low temperatures, which can be used for shrink packaging within a wide range of shrink packaging temperatures, and in which the film remains tight and free from looseness for a long period of time after shrink packaging.

2. Description of the Prior Art

It is well known in the art that a variety of thermoplastic resins can have imparted thereto the property of heat shrinkability when the resins are formed into films under molten conditions, cooled, and stretched under heating conditions.

The heat shrinkability of thermoplastic resin films has been widely utilized in so-called "shrink packaging" wherein an article is loosely packed in a stretched film, followed by heating to shrink the film into close contact with the article, thus decreasing the package volume and improving the saleability of the article.

Various kinds of films of the above-mentioned type have been put on the market, including those made of polypropylene, polyethylene, polyvinyl chloride and the like. Of these, polypropylene film has been recently widely employed for the above purpose owing to its excellent inherent properties such as transparency, gloss, moisture-proof property, non-toxicity, etc. However, known polypropylene-based films for shrink packaging have several disadvantages, including: they do not undergo significant heat shrinkage until they are heated to a high temperature; they possess a very narrow temperature range suitable for effecting shrink packaging; and their percentage of shrinkage is greatly changed by even a slight change in the shrinking temperature.

Accordingly, it is essential in the shrink-packaging step to exactly control and maintain the hot air temperature in the shrinking tunnel at a high and uniform level. When the hot air temperature is too low, the film becomes creased and rumpled due to insufficient shrinkage thereof. On the other hand, if the temperature is too high, the film will be melted and become broken. In addition, non-uniformity of the hot air temperature in the shrinking tunnel will disadvantageously produce pock-marked shrinkage irregularities owing to differences in the degree of shrinkage, thus impairing the appearance of the packaged article. Further, a conventional polypropylene-based film for shrink packaging also has the important disadvantage that even if the article is closely and tightly contacted by the packaging film immediately after the shrink packaging treatment, the film will naturally elongate and loosen with the passage of time, thus reducing the tightness and attractive appearance of the shrink-packaged article.

In order to overcome the disadvantages of known polypropylene-based films for shrink packaging, Japanese Patent Publication Nos. 43-26114 and 45-23437 describe methods for preparing films with excellent heat shrinkability by biaxially stretching films of ethylene-propylene copolymers containing a major proportion of propylene. Further, Japanese Patent Publication No. 43-26115 describes a method for preparing shrink-packaging film in which a mixture of (a) a major proportion of polypropylene and (b) a minor proportion of an ethylene-propylene copolymer containing a major proportion of ethylene, is used as the film-forming material and the film is biaxially stretched whereby once the film is shrunk, it does not stretch and loosen, such as would otherwise occur with the passage of time after completion of the shrink packaging.

However, these methods still present some problems under the existing conditions in which the time period for passing the packaged article through a shrinking tunnel is made very short in order to speed up the shrink packaging step and, hence, the shrink packaging is effected by instantaneously blowing hot air on the shrinkable film. Accordingly, there is a strong demand for the development of a polypropylene-based film for shrink packaging which has an excellent shrinkability at low temperatures and which does not stretch and become loose after completion of the shrink packaging.

It is, therefore, an object of the present invention to provide a process for preparing a polypropylene-based film for shrink packaging which overcomes the above-mentioned disadvantages of the prior art.

It is another object of the present invention to provide a process for preparing a polypropylene-based film for shrink packaging which has excellent low temperature shrinkability.

It is a further object of the present invention to provide a process for preparing a polypropylene-based film for shrink packaging which has a high degree of heat shrinkability over a wide range of shrink-packaging temperatures.

It is a still further object of the present invention to provide a process for preparing a polypropylene-based film for shrink packaging by which uniform and satisfactory shrink packaging is feasible at high speed without exactly controlling the temperatures of the hot air in the shrinking tunnel.

It is an additional object of the present invention to provide a method for preparing a polypropylene-based film for shrink packaging in which the shrunk film does not elongate or loosen after completion of the shrink packaging.

SUMMARY OF THE INVENTION

The above and other related objects of the present invention are attained by a process for preparing a polypropylene-based film for shrink packaging characterized by forming into a tubular film a mixture of (A) a member selected from the group consisting of crystalline polypropylene and a crystalline ethylene-propylene copolymer containing a major proportion (over 90 percent by weight) of propylene units (hereinafter referred to simply as ethylene-propylene copolymer), and mixtures thereof, and (B) an ethylene-vinylacetate copolymer containing a major proportion (50 to 90 percent by weight) of ethylene units (hereinafter referred to simply as ethylene-vinylacetate copolymer), and biaxially stretching the thus-formed tubular film. The resultant film exhibits the inherent properties of polypropylene with regard to transparency, gloss, moisture proofness, etc.

That is, the process of the invention comprises providing a starting mixture of (A) a base polymer such as crystalline propylene or an ethylene-propylene copolymer having an ethylene content up to 10% by weight and (B) an ethylene-vinyl acetate copolymer with a vinyl acetate content of 10 to 50% by weight, wherein the amount of (B) is from 1 to 10% by weight, based on the sum of the weights of (A) plus (B), extruding the mixture under molten conditions in the form of a tubular film, cooling the tubular film, and biaxially stretching the tubular film at a temperature of 110° to 130° C. at draw ratios of from 3.5 to 5.3 in both the lengthwise (machine) and widthwise (transverse) directions, respectively.

The base polymer (A) suitable for the purpose of the invention is, as mentioned above, a crystalline propylene homopolymer or an ethylene-propylene copolymer. Of these, the ethylene-propylene copolymer is preferred. As is well known, the ethylene content thereof is up to 10% by weight. When the ethylene content is less than 1% by weight, no significant improved effect is obtained in comparison with the use of the propylene homopolymer. When the ethylene content is greater than 4% by weight, the inherent properties of the polypropylene with regard to transparency, gloss and the like are lost. As will be understood from the above, the ethylene content in the ethylene-propylene copolymer is generally in the range of 1 to 10% by weight, preferably 2 to 4% by weight.

The ethylene-vinylacetate copolymer (B), which is mixed with the base polymer (A), has a vinyl acetate content of from 10 to 50% by weight. In this connection, the vinyl acetate content is preferred to be below 50% by weight from the viewpoint of ease of handling in actual operation because ethylene-vinylacetate copolymers with a vinyl acetate content below 50% by weight are utilizable in the form of granules. In addition, when the vinyl acetate content is below 10% by weight, a satisfactory result cannot be obtained unless the mixing ratio of the ethylene-vinylacetate copolymer to the base polymer is excessive. The use of such an ethylene-vinylacetate copolymer in an excessive amount results in a loss of the favorable properties of polypropylene with regard to transparency, gloss, etc., and gives a bad effect on the biaxial stretching process. Thus, the use of an ethylene-vinylacetate copolymer having a vinyl acetate content below 10% by weight is not preferred. The vinyl acetate content is generally in the range of 10 to 50% by weight, preferably 30 to 40% by weight. The amount of the ethylene-vinylacetate copolymer is in the range of 1 to 10% by weight, preferably 3 to 5% by weight, based on the total weight of resins A and B. When the amount is below 1% by weight, the resultant film becomes poor in low temperature shrinkability and tends to elongate readily and become loose after completion of shrink packaging. When the amount is above 10% by weight, the resultant film is considerably impaired in transparency and gloss, thus being unsuitable for packaging purposes. Further, the addition of the ethylene-vinylacetate copolymer in an amount greater than 10% by weight makes it difficult to effect the biaxial stretching process in a satisfactory manner.

The polypropylene-based film for shrink packaging provided by the present invention shows an excellent low temperature shrinkability without impairing the excellent inherent properties of polypropylene and it can be used for a shrink packaging process over a wide range of temperatures, so that it is possible to effect a shrink-packaging operation at a higher speed than in cases of prior films and to shrink-pack an article with the film in a closely contacted beautiful fashion. Moreover, the packaged article retains an attractive appearance, like that obtained immediately after the shrink packaging, even several months after the packaging operation, and no looseness of the shrunk film occurs.

The present invention will be further described by reference to the following illustrative experiments.

A crystalline ethylene-propylene copolymer (having an ethylene content of 3% by weight, a melt index of 6.5 and a density of 0.90) is mixed with low density polyethylene (having a melt index of 1.5 and a density of 0.923) and various kinds of ethylene-vinylacetate copolymers in different mixing ratios, as listed in Table 1 below to give fifteen kinds of film-forming compositions.

The fifteen kinds of film-forming compositions are each melted and extruded by means of a 50 mm diameter extruder and a 100 mm diameter circular die, cooled, and withdrawn at a rate of 5 m/min to obtain an unstretched tubular film with a thickness of 240μ and a folded width of 150 mm. Then, each of the tubular films is passed through a known tubular-type biaxial stretching apparatus in which the film is heated by hot air for 20 seconds at its lowest stretchable temperature and then is biaxially stretched in a tubular form simultaneously in the lengthwise (machine) and widthwise (transverse) directions at draw ratios of 4.2 and 4.0, respectively. The thus-stretched film is thermally treated for 5 seconds in an atmosphere at 100° C. and it contracts by 5% in both machine and transverse directions, and then it is taken up to obtain a biaxially stretched film having a thickness of 15μ. The thus-obtained biaxially stretched films are subjected to the measurements shown in Table 1, in which the test results are also shown.

Table 1

| Experiment No. | Content of ethylene propylene copolymer (%) | vinyl acetate content in ethylene-vinyl-acetate copolymer (%) | amount of ethylene-vinyl-acetate copolymer (%) | stretching temperature (°C.) | 80° C. | percentage of thermal shrinkage 100° C. | 120° C. | haze (%) | stability for production |
|---|---|---|---|---|---|---|---|---|---|
| 1 | 100 | 0 | 0 | 130 | 5.5 | 15.0 | 33.5 | 2.3 | good |
| 2 | 97 | 0 | 3 | 130 | 7.0 | 16.5 | 32.5 | 2.5 | good |
| 3 | 99 | 5 | 1 | 130 | 5.0 | 17.0 | 35.0 | 2.3 | good |
| 4 | 97 | 5 | 3 | 130 | 7.0 | 16.0 | 35.0 | 2.4 | good |
| 5 | 95 | 5 | 5 | 125 | 8.0 | 18.0 | 39.0 | 2.6 | good |
| 6 | 90 | 5 | 10 | 130–120 | 8.0 | 19.0 | 36.5 | 5.2 | fair |
| 7 | 85 | 5 | 15 | 130–120 | | | | | poor |
| 8 | 97 | 10 | 3 | 120 | 8.0 | 18.0 | 38.0 | 2.5 | good |
| 9 | 97 | 20 | 3 | 120 | 8.0 | 19.0 | 40.5 | 2.3 | excellent |
| 10 | 99 | 35 | 1 | 125 | 7.5 | 16.5 | 38.0 | 2.3 | good |

Table 1-continued

| Experiment No. | Content of ethylene propylene copolymer (%) | vinyl acetate content in ethylene-vinyl-acetate copolymer (%) | amount of ethylene-vinyl-acetate copolymer (%) | stretching temperature (°C.) | percentage of thermal shrinkage 80° C. | 100° C. | 120° C. | haze (%) | stability for production |
|---|---|---|---|---|---|---|---|---|---|
| 11 | 97 | 35 | 3 | 115 | 10.0 | 20.0 | 42.0 | 2.2 | excellent |
| 12 | 95 | 35 | 5 | 110 | 10.0 | 22.5 | 48.0 | 2.5 | excellent |
| 13 | 90 | 35 | 10 | 110 | 9.5 | 22.0 | 49.0 | 3.9 | good |
| 14 | 85 | 35 | 15 | 110 | 11.5 | 25.0 | 47.0 | 4.8 | good |
| 15 | 97 | 40 | 3 | 110 | 9.5 | 21.5 | 44.5 | 2.5 | excellent |

The properties of the films shown in Table 1 are determined as follows:

(1) Percentage of thermal shrinkage: A 100 mm wide × 100 mm long sample is immersed in a glycerin bath having a predetermined temperature for 5 seconds, then is withdrawn from the bath and cooled in water. Then, the width and length of the thus cooled sample are measured to determine an average value of the percentages of thermal shrinkage in the two directions.

(2) Haze: According to the method of ASTM D-1003-61.

(3) Stretching temperature: Determined as the highest temperature of non-stretched tubular film which has been measured during passage through the stretching zone.

(4) Stability for production: Determined by visual observation of tubular film in terms of the degrees of meandering and bursting of the film during the stretching process.

As will be understood from the above experimental results, there is almost no change in the optical property independently of the content of vinyl acetate in the ethylene-vinylacetate copolymer, so long as the content of the copolymer in the material is up to about 5%. However, when the copolymer content is 10% or above, the resultant films are deteriorated in their optical property to a considerable extent. With regard to thermal shrinkage, a higher content of vinyl acetate makes possible a lower temperature stretching process when the ethylene-vinylacetate copolymer is employed in the same mixing ratio, thus giving a favorable effect on low temperature shrinkability. The addition of an ethylene-vinylacetate copolymer with a greater content of vinyl acetate produces a better result with regard to biaxial stretching tendency. In particular, the addition of an ethylene-vinylacetate copolymer with a vinyl acetate content above 20% in an amount of 3-5% is more effective to improve the biaxial stretching stability when compared with a film formed from a crystalline ethylene-propylene copolymer. In view of the above data, it will be recognized that, for best results, the ethylene-vinylacetate copolymer which has a vinyl acetate content of above at least 10%, preferably 20% or more, should be added in the range of 1 to 10%, preferably 3 to 5%, based on the total resins, whereby the resultant film has excellent shrinkability at relatively low temperature without impairing the high transparency and gloss of polypropylene per se and it is improved in biaxial stretching stability.

A shrink-packaging test is effected in which a crystalline ethylene-propylene copolymer (with an ethylene content of 3%, a melt index of 6.5 and a density of 0.90) is mixed with an ethylene-vinylacetate copolymer (with a vinyl acetate content of 35%, a melt index of 60 and a density of 0.96) in different mixing ratios, as shown in Table 2, to obtain six kinds of mixtures to be used as the film-forming materials. The six kinds of the film-forming materials are each formed into a biaxially stretched film with a thickness of 15μ in the same manner as described above. Thereafter, a plywood square having a thickness of 6 mm and a side length of 200 mm is wrapped loosely with each of the biaxially stretched films wherein the dimensions of the film are 20% larger than the corresponding dimensions of the plywood squares, followed by passing the wrapped squares through a commercial shrinking tunnel at 160° C. for 3 seconds to give a neatly finished rumple-free sample, i.e., the plywood is closely covered with the shrunk film. Then, each of the shrink-packaged samples is allowed to stand for 30 days in a constant temperature-humidity room at a temperature of 23° C. and a humidity of 60% to observe changes in the packaging state.

The test results are shown in Table 2.

Table 2

| Experiment No. | content of ethylene-propylene copolymer (%) | content of ethylene-vinylacetate copolymer (%) | packaging state observed after 30 days |
|---|---|---|---|
| 16 | 100 | 0 | Shrunk film is elongated and cockled, and hence the shrink-packaged article is impaired in its beautiful appearance. |
| 17 | 99.5 | 0.5 | Shrunk film surface is cockled in a slighter degree, and the shrink-packaged article is also impaired in beautiful appearance. |
| 18 | 99 | 1 | No cockle appears on the film surface, but the beautiful appearance |

Table 2-continued

| Experiment No. | content of ethylene-propylene copolymer (%) | content of ethylene-vinylacetate copolymer (%) | packaging state observed after 30 days |
|---|---|---|---|
| 19 | 98 | 2 | is impaired to a slight degree in comparison with that obtained immediately after the shrink packaging. No elongation occurs in the shrunk film and the beautiful appearance obtained immediately after the shrink package is maintained as is. |
| 20 | 97 | 3 | " |
| 21 | 95 | 5 | " |
| 22 | 90 | 10 | " |

As will be understood from the above experimental results, the films which have been obtained by extruding and biaxially stretching in the form of a tubular film, a mixture of a crystalline ethylene-propylene copolymer and an ethylene-vinyl acetate copolymer in an amount of greater than 1%, preferably greater than 2%, are capable of maintaining as beautiful an appearance, over a long period of time, as that obtained immediately after shrink packaging, thus being suitable for shrink packaging purposes.

Further, a stretching experiment is effected in which the mixed film-forming material of Experiment No. 12 is treated in the same manner as in the process for Table 1, but using different stretching temperatures as shown in Table 3 below, thereby to obtain five kinds of biaxially stretched films. The films are subjected to determination of the percentage of shrinkage. The test results are shown in Table 3 in which the states of the films under different stretching temperature conditions are also shown.

Table 3

| Experiment No. | stretching temp. (°C.) | percentage of shrinkage (%) | | | state under stretching conditions |
|---|---|---|---|---|---|
| | | 80° C. | 100° C. | 120° C. | |
| 23 | 100 | — | — | — | Impossible to stretch |
| 24 | 110 | 10.0 | 22.5 | 48.0 | Film can be stretched in a very stable manner and the stretched film is excellent in accuracy of thickness, transparency and gloss. |
| 25 | 120 | 8.5 | 20.5 | 42.0 | " |
| 26 | 130 | 6.0 | 16.5 | 35.0 | Film tube moves in a zigzag direction and is often burst and the resultant film is slightly inferior in accuracy of thickness, transparency and gloss. |
| 27 | 150 | — | — | — | Stretching stability is very poor, making it difficult to stretch a tubular film satisfactorily. The stretched film is just like frosted glass in appearance and very poor in accuracy of thickness. |

In the above Table, the stretching temperature means the highest temperature of the unstretched tubular film experienced during the stretching process.

As will be clear from the above experimental results, a better result is obtained at a lower stretching temperature with regard to thermal shrinkability. However, the stretching process is not feasible below 100° C. With the stretching temperature above 150° C., the stretching stability becomes very poor and the stretched film is not satisfactory in appearance and properties. Thus, the film temperature in the stretching process of the invention should be in the range of 110°–130° C., preferably 110°–120° C.

We have made a still further experiment concerning the draw ratio in which the film-forming material of Experiment No. 12 is used for effecting a stretching process in the same manner as in the experiment of Table 1 in different stretching ratios. As a result, it has been found that, with stretching ratios of less than 3.5, the accuracy of thickness becomes very poor, while, with ratios above 5.3, the stretching stability is impaired, giving rise to frequent bursting of tubes. From this, the stretching ratios in the lengthwise and widthwise directions are each in the range of 3.5 to 5.3, preferably 3.8 to 4.8.

BRIEF DESCRIPTION OF THE DRAWING

The drawing is a graph of the percentage of thermal shrinking versus shrinking temperature for the film described in the following Example and a control film made according to the foregoing Experiment 1.

The present invention will be further illustrated in the following example.

EXAMPLE

A crystalline ethylene-propylene copolymer (with an ethylene content of 3%, a melt index of 6.5 and a density of 0.90) to which was added an ethylene-vinylacetate copolymer (with a vinyl acetate content of 35%, a melt index of 60 and a density of 0.96) in an amount of 5%, based on the total resins, was melted and extruded by the use of a 50 mm diameter extruder and a 100 mm diameter die, followed by cooling and withdrawing at a rate of 5 m/min to obtain an unstretched tubular film having a thickness of 240μ and a folded width of 150 mm. Then, the tubular film was passed through a known tubular-type biaxial stretching device in which the film was heated by hot air in such a manner as to reach 110° C. in the stretching zone and was subjected to a simultaneous stretching treatment at ratios of 4.2 and 4.0 in the directions of length and width, respectively, followed by thermal treating at 100° C. for 5 seconds while contracting by 5% in both machine and transverse directions. The resultant film having a thickness of 15μ had an excellent transparency and gloss as compared to polypropylene. In addition, the biaxially stretched film was far superior in low temperature shrinkability to the known propylene-based film of Experiment No. 1 for shrink packaging and had a wide temperature range suitable for shrink packaging, as clearly shown in the drawing in which the percentage of thermal shrinkability is plotted against temperature for the respective films. Thereafter the biaxially stretched film was subjected to a shrink packaging test wherein a cup for noodles was shrink-packaged with the film by means of a commercially available thermal shrink-packaging machine (produced by TOKIWA KOGYO K.K., and having a tunnel length of 1.8 m) at a tunnel temperature of 160° C. at a feeding rate of 120 cups/min. As a result, the cups which were closely covered with the film had a rumple-free beautiful appearance, no substandard articles being produced. The thus shrink-packaged cups were allowed to stand in a constant temperature-humidity room of a temperature of 23° C. and a humidity of 60% for about 1 month. The packaged cups remained as beautiful as those obtained immediately after completion of shrink packaging.

The embodiments of the invention in which an exclusive property or privilege is claimed are defined as follows:

1. A process for preparing a film for shrink packaging which comprises extruding a tubular film of a film forming composition consisting essentially of
   A. a crystalline ethylene-propylene copolymer containing 2 to 4% by weight of ethylene monomer units, and
   B. an ethylene-vinyl acetate copolymer containing from 10 to 50% by weight of vinyl acetate monomer units, wherein the amount of B is from one to 5% by weight, based on the sum of A plus B;

cooling the extruded tubular film to solidify same; and then effecting biaxial stretching of said tubular film, at a temperature of from 110° to 130° C., at draw ratios in both the machine and transverse directions in the range of 3.5 to 5.3.

2. A process as claimed in claim 1 in which the amount of B is from 3 to 5% by weight, based on the sum of A plus B.

3. A process as claimed in claim 1 in which component B is an ethylene-vinyl acetate copolymer containing 30 to 40% by weight of vinyl acetate monomer units, the amount of B is from 3 to 5% by weight based on the sum of A plus B, the biaxial stretching temperature is from 110° to 120° C. and the draw ratios are from 3.8 to 4.8.

* * * * *